United States Patent [19]

Binzen

[11] Patent Number: 4,699,187

[45] Date of Patent: Oct. 13, 1987

[54] DUST CONTROL IN HOPPERS

[75] Inventor: Willard Binzen, Gibsonia, Pa.

[73] Assignee: Dravo Corporation, Pittsburgh, Pa.

[21] Appl. No.: 922,516

[22] Filed: Oct. 23, 1986

[51] Int. Cl.[4] .............................................. B65B 1/04
[52] U.S. Cl. ........................................ 141/5; 141/93; 141/286
[58] Field of Search ........................ 141/93, 289–310, 141/1–12

[56] References Cited

U.S. PATENT DOCUMENTS

| | | | |
|---|---|---|---|
| 3,424,501 | 1/1969 | Young | 141/93 |
| 3,885,606 | 5/1975 | Krauss | 141/198 |
| 3,908,720 | 9/1975 | Garnett | 141/93 |
| 4,061,221 | 12/1977 | Higashinaka et al. | 141/93 |
| 4,095,625 | 6/1978 | Marpe | 141/93 |
| 4,225,033 | 9/1980 | Fukagai et al. | 141/93 |
| 4,396,045 | 8/1983 | Cain | 141/286 |
| 4,420,285 | 12/1983 | Loyer et al. | 141/93 |

Primary Examiner—Houston S. Bell, Jr.
Attorney, Agent, or Firm—Parmelee, Miller, Welsh & Kratz

[57] ABSTRACT

A bulk material receiving hopper is provided with a dust containment system which includes sloped shield plates positioned adjacent a top portion of the hopper to effectively close-off substantially all of the open space thereacross. Restricted material openings are defined by the shield plates and an isolated, dust containment region is established therebeneath to trap the displaced air and entrained fugitive dust generated during a dumping operation. One or more dust collector units communicate with the isolated dust containment region to draw in the displaced air and entrained dust particles.

22 Claims, 9 Drawing Figures

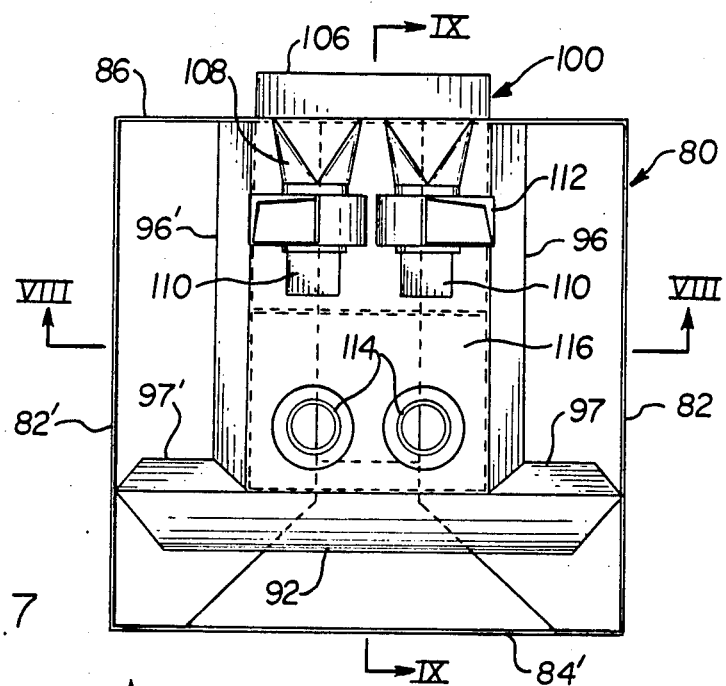
FIG. 7
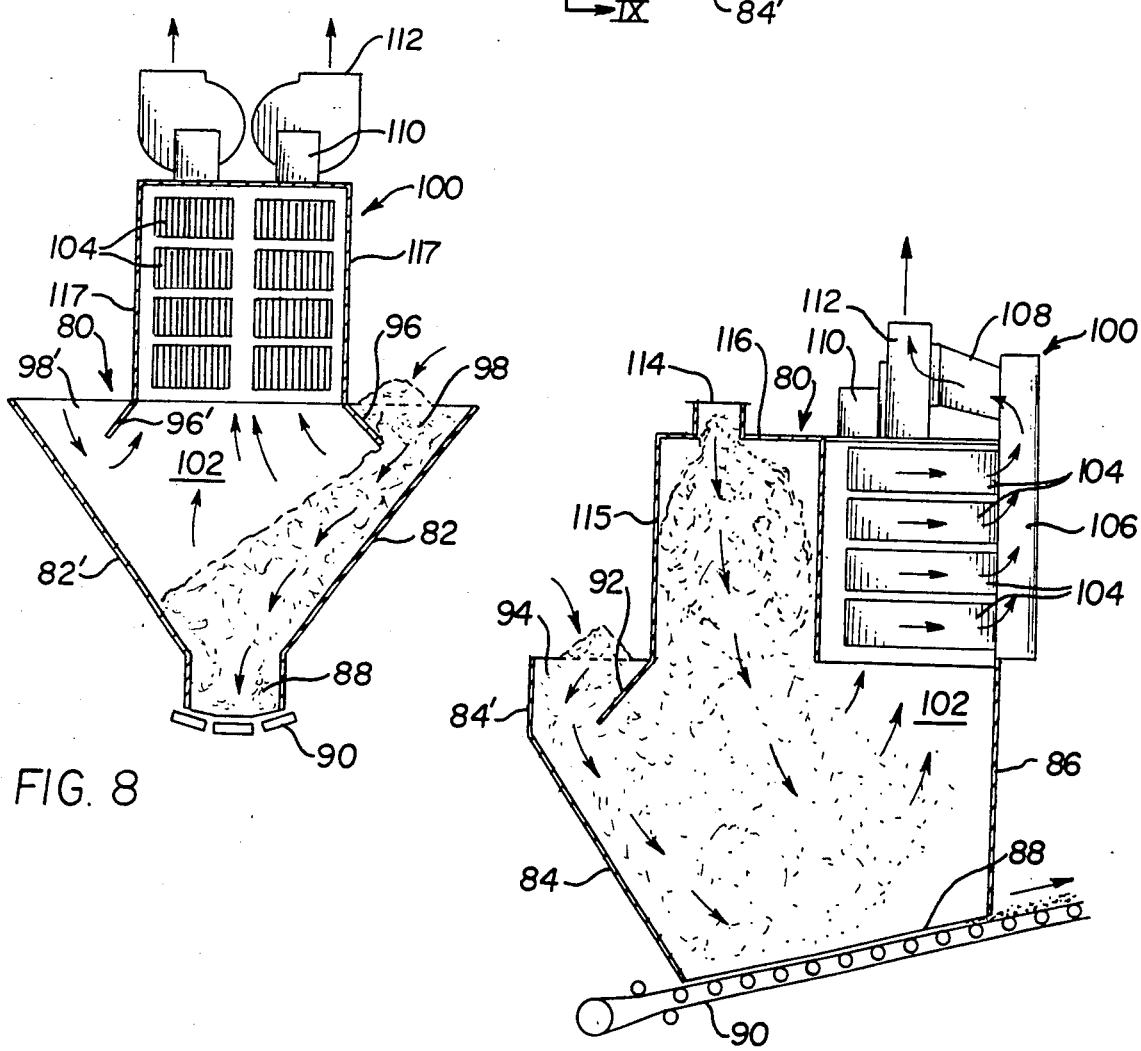
FIG. 8
FIG. 9

DUST CONTROL IN HOPPERS

BACKGROUND OF THE INVENTION

The present invention relates generally to the control of dust laden air in material handling operations and, more particularly, to the control and abatement of dust in the loading of particulate materials in large hoppers of the type generally employed at marine terminals, rail terminals and like high tonnage bulk material transfer centers. Conventionally, in the unloading of particulate materials from cargo holds of ships, from rail cars, storage bins and such bulk receptacles, the particulate cargo is transferred from the receptacle by various means, such as, clamshell buckets, conveyor belts, car dumpers, front end loaders and the like, and the material is then dumped into a receiving hopper which directs the material to a take-away system in the form of a conveyor belt, truck or the like. When certain types of bulk materials are discharged by gravity into the hopper, large clouds of dust laden air are emitted into the surrounding environment. This air pollution problem has received very close attention in terminals located near populated areas and many operations are threatened with monetary fines, reduced tonnages, or outright shut-down, if the nuisance is not abated or controlled to acceptable levels.

The size of receiving hoppers varies, and is usually determined more by the size of the equipment filling the hopper rather than by the volume of bulk material to be discharged into it. Clamshell buckets, front end loaders, trucks, railroad cars and such, deliver the bulk material to the receiving hopper and, as such, the hopper dimensions must exceed the physical dimensions of these pieces of equipment. These oversized dimensions are needed in order to satisfy the generally expected misalignment of the loading equipment relative to the hopper due to bucket swing, overshooting, reach, operator adeptness, to name a few. Thus, the volume of material being handled is relatively small when compared with the volume of the hopper. This excessive, open space within the hopper results in random flow patterns of displaced air when the material is dumped which permits the escape of fugitive dust clouds into the surrounding environment.

In one conventional dust collection system which has been developed in an attempt to control dust emission problems in receiving hoppers, an air suction system is placed around the hopper in an attempt to draw in all of the rapidly rising fugitive dust streams. These intake duct systems must be installed in close proximity to, but spaced from the potential flow lines of the dumped material. The large physical size of the hoppers dictates that this location be safely fixed around the perimeter of the upper rim of the hopper. The negative draft influence of these conventional intake ducts is very limited since the influence of the negative draft decreases by the square of the distance from the duct. Thus, these prior systems are rendered ineffective when attempting to collect displaced dust laden air leaving the central regions of the hopper at high flow velocities. Massive air movement is required to increase the dust collecting efficiency of these prior devices but that can only be realized by greatly increasing the fan capacity. The viability of this approach is negated by the correspondingly high equipment costs and increased operating expenses resulting from the increase in the fan horsepower requirements.

It is also known to employ vertically extending barriers around three sides of a hopper so as to create a wind screen in an effort to diminish the effect of cross-winds on the escaping dust clouds. Naturally, this approach to dust emission control is not totally satisfactory since the hopper itself is still free to generate fugitive dust.

My invention solves these problems by providing a dust control system for hoppers which is elegantly simple, relatively inexpensive to construct and cost efficient to operate. My invention provides a dust control method and apparatus for hoppers in which the displaced air carrying the generated dust in the hoppers is totally captured. The dust control system of the present invention provides a hopper with restricted material and air flow paths in which displaced air is directed towards an isolated region within the hopper which contains the dust collection devices. By capturing the displaced air and dust within the hopper area, the volume of air and required fan horsepower are kept to a minimum due to the confined space involved. Thus, the present invention provides a dust control system for receiving hoppers in which both capital and operating costs are lowered due to the decreased horsepower requirements, while dust collection efficiency is dramatically increased as compared with conventional dust control systems.

SUMMARY OF THE INVENTION

These as well as the other advantages are provided by the present invention which, briefly stated, comprises shield means, in the form of one or more air impervious plate members positioned within the upper portion of the hopper and in the flow path of the bulk material. Restricted material and air flow paths of constant location are created between the hopper and the exposed edges of the shield plates and an isolated, dust containment region is established on the underside of the shield plate. Dust collection means, in the form of one or more self-contained dust collector units, or the inlet duct or ducts of a larger remotely placed collector unit, are positioned within the isolated dust containment region beneath the shield means. The dust collectors create a negative draft within the isolated area to draw in the displaced air and suspended dust particles. The fan or fans of the dust collector means is sized sufficiently to handle an air capacity at least as great as the volume of displaced air which is instantaneously created by the dumped material. More preferably, the dust collection fan or fans are sized to handle the volume of displaced air within the hopper but also of sufficient capacity to create a negative draft at the restricted openings of the shield plates. In this manner, clean outside air is drawn downwardly into the hopper to capture any dust generated outside of the shielded area, such as that generated when the dumped material strikes the exterior of the shield plates.

The specific shield plate and dust collector configurations are easily modified within the spirit of the present invention to adapt their use in connection with various types of hoppers, such as, for example, dockside hoppers for clamshell, grab bucket or crane unloaders in ship unloading, hoppers for receiving material from both conveyor belts and front end loaders and also for use in rotary railroad car dumper hoppers, and like installations, involving the transport and transfer of dusty bulk materials.

A method of controlling dust emissions in bulk material receiving hoppers according to the present invention, briefly stated, includes the steps of:

placing shield plate means within the receiving hopper to decrease the open space of the hopper and provide restricted flow passages for the bulk material being dumped;

creating an isolated dust containment region beneath the shield plate means to trap displaced air and fugitive dust therein;

providing a negative draft of air within the isolated dust containment region to draw in the displaced air and fugitive dust; and transmitting the displaced air and fugitive dust to dust collector means to capture the dust and exhaust clean air therefrom.

BRIEF DESCRIPTION OF THE DRAWINGS

These, as well as other objects and advantages of the present invention, will become more apparent when reference is made to the following detailed description when taken with the accompanying drawings, in which:

FIG. 7 is a plan view of a hopper suitable for use in receiving material from a conveyor belt and from a front end loader showing the dust control system of the present invention in place thereon;

FIG. 8 is a cross-sectional view taken along line VIII—VIII of FIG. 7; and

FIG. 9 is a cross-sectional view taken along line IX—IX of FIG. 7.

DETAILED DESCRIPTION OF THE INVENTION

Figure 2:
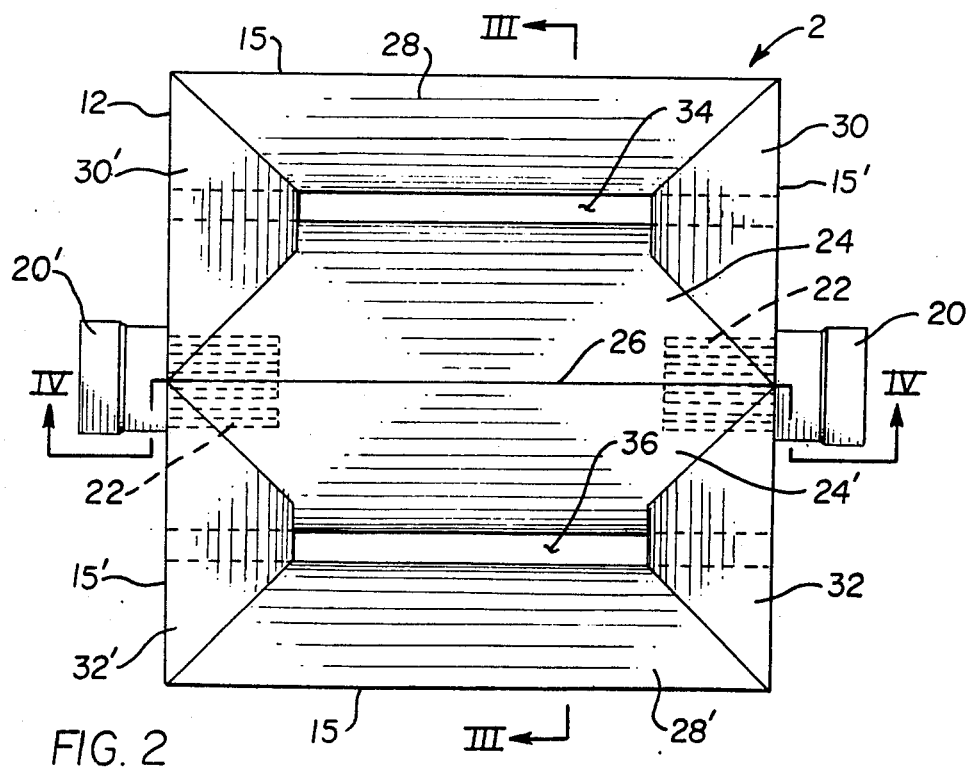
FIG. 2 is a plan view of the hopper of FIG. 1.
Figure 3:
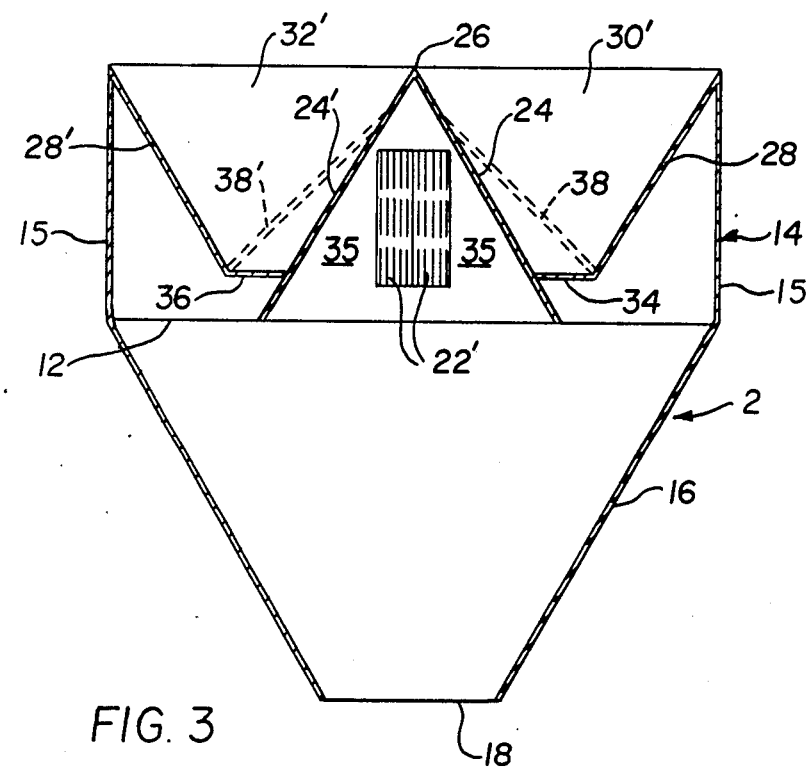
FIG. 3 is a cross-sectional view taken along line III—III of FIG. 1.
Figure 4:
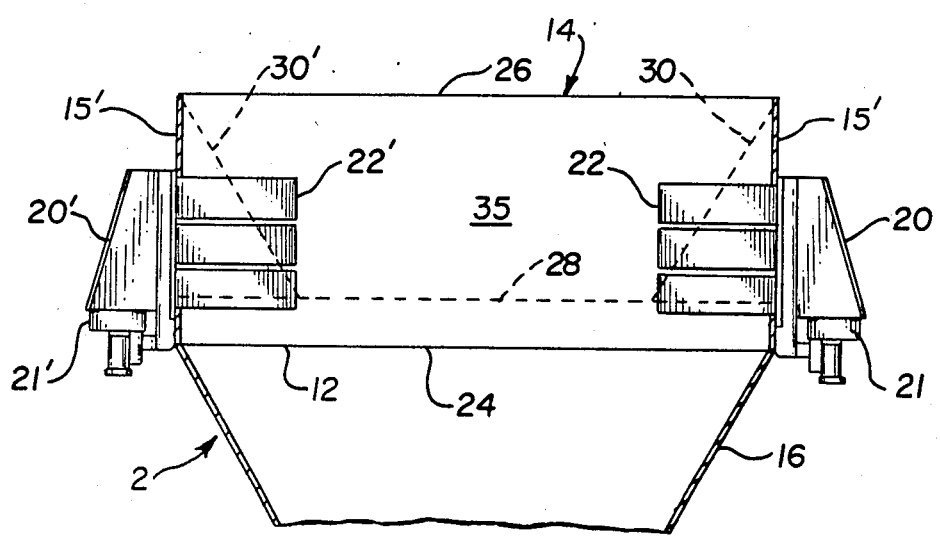
FIG. 4 is a partially fragmented, cross-sectional view taken along line IV—IV of FIG. 2.

Referring now to the drawings, a presently preferred embodiment of the present invention is shown in place on a hopper, generally designated 2, in FIGS. 2-4. Hopper 2 receives bulk particulate material from a clamshell bucket 4 of the type which may be employed in ship unloading operations and the like. The hopper 2 is supported by a structural frame 6 and is fitted with wheels 8 to permit the hopper unit 2 to be moved to any number of unloading sites. Adjacent each wheel location is a hydraulic jacking device to provide a firm base when the hopper 2 is located at its intended work site.

The hopper 2 includes an open inlet area 12 at the top with a dust containment section 14 situated therebeneath, the functioning of which will be explained in greater detail hereinafter. A sloped and tapered hopper chute section 16 extends downwardly from the sidewalls of dust containment section 14 to direct the dumped material to a discharge outlet 18 formed at the bottom of the hopper. Bulk material discharged through outlet 18 is removed by a conventional takeaway conveyor belt, truck or the like (not shown). When a load of material is dumped from a clamshell bucket, such as bucket 4, it falls by gravity into the hopper and immediately displaces a volume of air, substantially equal to the volume of dumped material. In usual clamshells, this volume may be on the order of between 270–450 cubic feet with an elapsed dumping time of about 3 seconds. In conventional hoppers, displaced air stream rapidly travels past the falling material to instantly create a large fugitive dust cloud, which quickly escapes into the surrounding environment.

According to the present invention, this heretofore common occurrence is eliminated in a relatively inexpensive and efficient manner. The dust containment section 14 of the hopper 2 is enclosed on the sides by vertical walls 15, 15' and is fitted with two main shield plates 24 and 24', preferably of steel, aluminum or the like. The shield plates are joined at a common edge 26 and extend across the open top area of the hopper to opposite walls 15' of the dust containment section 14. As seen in FIG. 3, the shield plates 24 and 24' are angularly inclined such that they slope downwardly toward the interior of the hopper and define an included angle beneath edge 26 of less than 90°. A steep slope is desired in order that the bulk material being dumped falls freely into the interior of the hopper 2 rather than being partially retained on the plates 24 and 24'.

In accordance with the present invention, the large open space at the top portion of a conventional hopper is dramatically reduced by the inclusion of the two main shield plates 24 and 24' and further reduced by sloped end plates 28, 28' and sloped side plates 30, 30' and 32, 32', which together converge downwardly to form restricted openings 34 and 36 on respective sides of the central edge 26, FIGS. 2-3. End plates 28, 28' and side plates 30, 30', 32, 32' are attached at their top edges to the vertical walls 15, 15', respectively, of the dust containment section 14. In this manner, bulk material is permitted to enter the interior of hopper 2 only through the restricted openings 34 and 36, which are of sufficient size to accept the volume of material being dumped. In this manner, displaced air within the hopper 2 can only exit the hopper interior by way of the restricted openings 34 and 36. As perhaps best seen in FIG. 3, the central shield plates 24, 24' form an isolated, dust trapping or containment space 35 beneath the surfaces thereof which blocks-off the major pathway of the displaced air and fugitive dust.

A pair of conventional self-contained dust collector devices 20, 20' are mounted on opposed sides of the hopper 2 within the walls 15' of the dust containment section 14. The dust collectors include a plurality of rectangularly shaped, hollow fabric filter elements 22, 22' which are positioned within the isolated dust containment space 35. The collectors 20, 20' also include motorized fans 21, 21', respectively, which create a negative draft within each of the hollow filter elements 20, 22' whereby the displaced air is withdrawn by the suction created by the collector fans 21, 21' while the entrained particulate material is deposited as a filter cake on the fabric filters 22, 22'. Clean exhaust air is discharged to the atmosphere by each of the fans 21, 21'.

Figure 1:
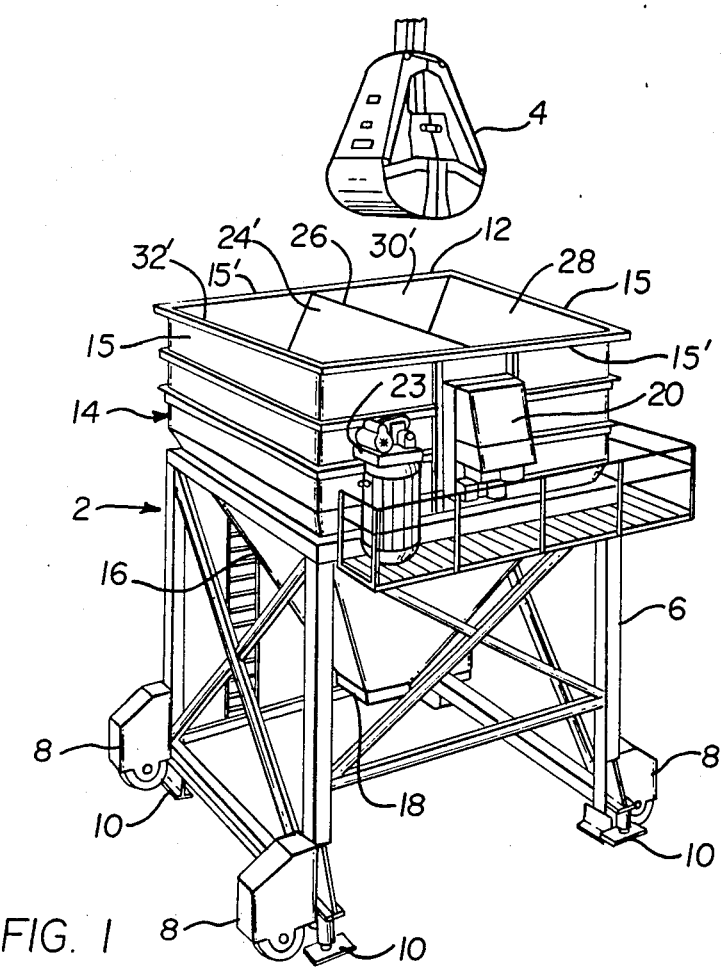
FIG. 1 is a perspective view of a hopper of the type used in ship unloading operations with a presently preferred embodiment of the present invention in place thereon.

Each of the collectors 20, 20' are preferably equipped with an automatic, compressed air back-flow cleaning apparatus to periodically remove the accumulated filter cake from the fabric filters 22, 22'. A source of compressed air, such as compressor 23, FIG. 1, communicates with the interiors of each of the filter elements 22, 22' in a known manner, to produce the desired back-cleaning effect. Since the filter elements 22, 22' are located within the interior of the hopper 2, the filter cake, which is removed during periodic back-flushing, falls by gravity to be recovered at the hopper discharge outlet 18, thus reducing bulk material losses.

The total fan capacity for the collectors 20, 20' is sized to handle, as a minimum, the volume of air displaced by the material discharged by the clamshell bucket 4. Typical buckets 4 have a dumping volume of between 10 to 16 cubic yards of bulk material. This volume of dumped material will displace between about 270 to 450 cubic feet of air within the hopper, in a time period of about three seconds. Hence, the fans 21, 21' are of a sufficient horsepower to handle at least this amount of displaced air volume per unit time so that the fugitive dust entrained therein cannot leave the confines of the hopper 2. Preferably, the fan motors 21, 21' are sized to draw even a greater volume of air than volume represented by the displaced air. By slightly over-sizing the fans, a downward draft of clean air is induced above the restricted openings 34, 36 to capture any secondary dust generated along the exterior of the shield plates. These secondary dust particles are drawn downwardly and through the restricted openings 34, 36 along with the clean outside air and entrapped by the filter elements 22, 22'.

The dust containment section 14 may also be fitted with a plurality of spaced-apart, so-called "grizzly bars" 38 as shown in phantom lines in FIG. 3. The respective sets of grizzly bars 38 extend across the width of the hopper 2, above the restricted openings 34, 35, sloping downwardly from opposite sides of the shield plates 24, 24' to lower edge portions of the end plate shields 28, 28'. The spacing between adjacent bars is fixed such that any over-sized lumps of bulk material are retained thereon so as to preclude possible blockage of the restricted openings 34, 36 or blockage of the take-away equipment situated beneath the hopper outlet 18.

The dust containment section 14 may be portable and preferably is secured to the top portion 12 of the hopper 2 by bolts or pins (not shown) along the perimeter defined by the lower edge of enclosing vertical walls 15, 15'. The entire section 14 can be detached and moved to a different hopper location if the hoppers are of the nonmovable type.

Figure 5:
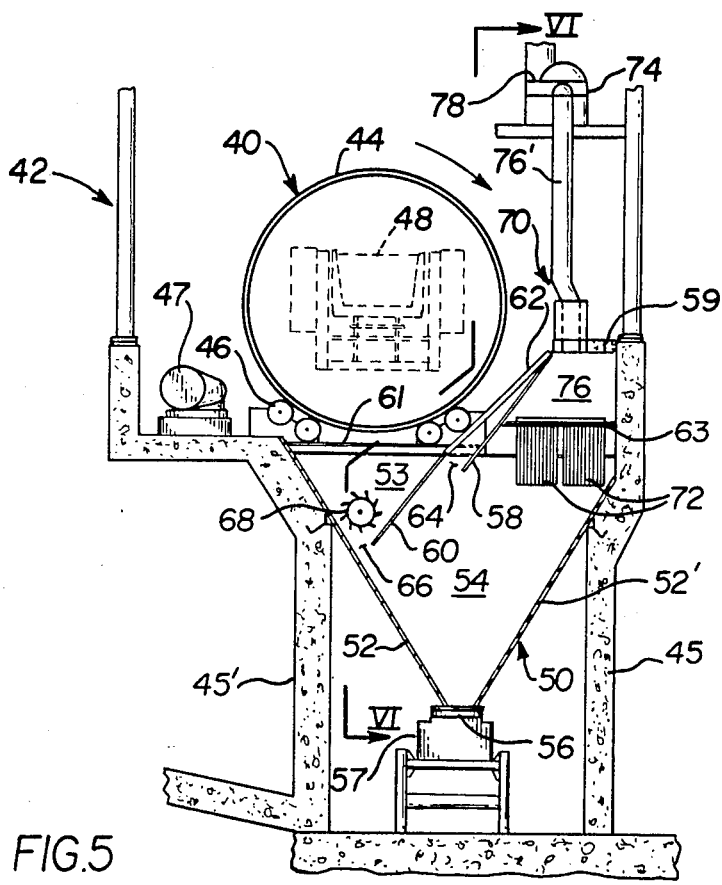
FIG. 5 is a partially fragmented, cross-sectional front elevation view of a rotary railroad car dumper installation with a further preferred embodiment of the present invention in place thereon.
Figure 6:
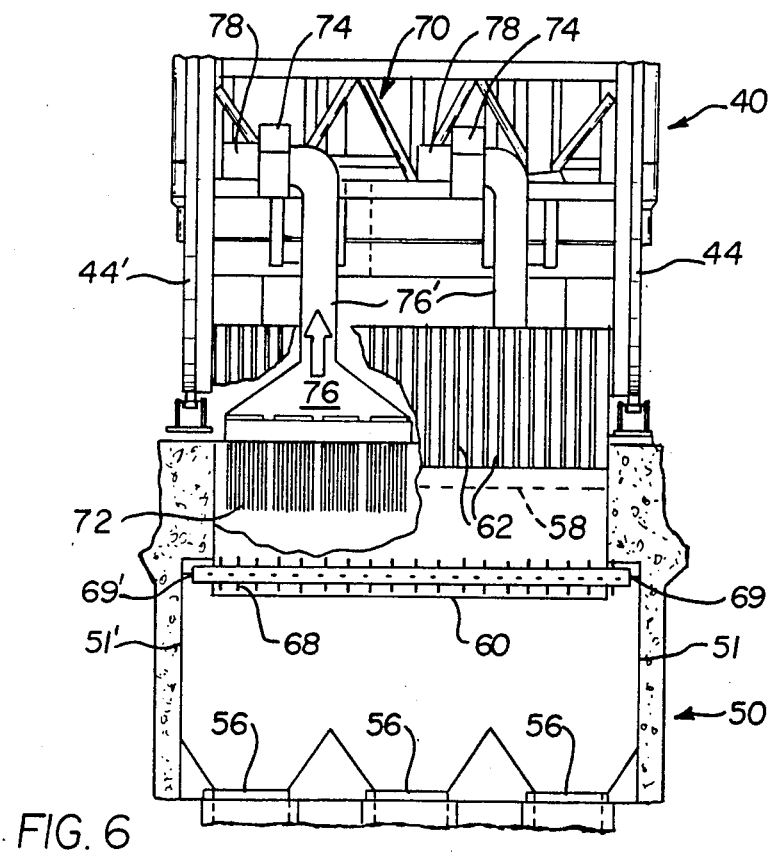
FIG. 6 is a partially fragmented, cross-sectional side elevation view taken along line VI—VI of FIG. 5.

Referring now to FIGS. 5 and 6, the dust control system of the present invention is shown in use with a conventional rotary railroad car dumper, generally designated 40. The usual car dumper installation is housed within a building 42 which serves to shelter the dumper 40 from the elements. The rotary dumper includes a pair of ring-shaped, end rings 44 which rotate about spaced pairs of support wheels 46 powered by a conventional drive motor 47. One or more railway cars 48 containing bulk material such as coal, ore, or the like, are moved within the interior of the dumper 40 and clamped, whereupon the end rings 44 are rotated, as in a clockwise direction in FIG. 5, to dump the contents of the car 4B into a receiving hopper 50 situated beneath the dumper 40. The collection hopper 50 of the material collection system includes opposed sloping sidewalls 52 and 52' having an open inlet section 53 at the top and a hopper outlet section 56 at the bottom thereof.

The sloping hopper sidewalls 52, 52' are anchored to the foundation walls 45, 45' of the dumper building 42 in conventional fashion. The bulk material collection system 50 also includes a take-away system in the form of a conveyor belt 57 situated beneath the hopper outlet 56 to remove the dumped bulk material to a remote location. The dust generated during the dumping cycle of a rotary car dumper is considerable in view of the large volume of bulk material being dumped into the hopper 50 within a relatively short time period. For example, a typical railway car may contain a cargo space of approximately 10 feet by 10 feet by 40 feet which represents a potential for displacing air within the hopper on the order of 4,000 cubic feet. Typically, a railroad car such as car 48 is completely dumped in about 5 to 6 seconds. The potential for creating large volume clouds of fugitive dust is, thus, readily appreciated within the environment of the rotary car dumper. 40.

In accordance with the present invention, a substantial majority of the open space existing at the top of the hopper 50 is closed off by sloping, shield plates 58 and 60 which create an isolated, dust containment space 54 beneath the surfaces thereof within the interior of the hopper 50. The shield plates 58 and 60 extend across the entire length of the hopper 50, between the end walls of the dumper pit as shown in FIG. 6. Shield plate 58, as shown in FIG. 5, extends in a downwardly sloping manner from ledge portion 59 of the dumper structure 42 to a position slightly below the building floor 61. An array of spaced-apart, "grizzly bars" 62 are fitted above the shield plate 58 and slope downwardly from ledge 59 to a position spaced above plate 58, a distance indicated as 64 in FIG. 5 which defines a first restricted opening for the passage of bulk material. The second shield plate 60 extends from the ends of the grizzly bars 62 at about the floor level 61 and slopes downwardly to terminate in spaced relation to the hopper sidewall 52. The open space between the terminal end of shield plate 60 and the hopper sidewall 52 defines a second restricted opening 66 in FIG. 5. When the car dumper 40 is rotated, bulk material in railroad car 48 is dumped therefrom with a majority of the particulate material passing through the spaced-apart array of grizzly bars 62 to pass through the first restricted opening 64 which exists between the shield plates 58 and 60 to be deposited within the hopper 50 for delivery to the take-away conveyor equipment 57.

Oversized lumps of bulk material, which cannot pass through the openings in the grizzly bars 62, slide downwardly along the grizzly bars and pass onto the second shield plate 60 to then be engaged by a rotating lump breaker device 68. Lump breaker 68 comprises a tube-like member having hardened bits extending outwardly from the surface thereof to rotatably engage and break-up oversized lumps of bulk material. The broken material is then able to pass through the second restricted opening 66 to be recovered by the take-away equipment 57 located beneath the hopper 50. The lump breaker drum 68 is rotatably mounted on its longitudinal axis by shafts 69 and 69' and includes an internal or external drive motor (not shown) to cause the selective rotation thereof when lumps are encountered in a shipment of material. The drum shafts 69 and 69' and/or drive motor are secured to the endwalls 51, 51' of the hopper pit structure, as shown in FIG. 6.

The displaced air and fugitive dust generated during a car dumping sequence are rapidly drawn in by a dust collector system 70. The dust collection system 70 includes a plurality of rectangularly shaped fabric filter elements 72 which are mounted within an isolated dust containment region 54, defined beneath the shield plates 58 and 60, within the interior of the hopper 50. The filter elements 72 are mounted on a plate-like member 63 which extends between building wall 45 and the shield plate 58. An air duct manifold 76 communicates with the filter element 72 and with air duct 76' which extends upwardly to a fan unit 74, having an exhaust duct 78 communicating therewith. As seen in FIG. 6, two fan units 74 with ducts 76' are preferably employed to create the necessary volumetric draft required for the railcar dumper application. In operation, the displaced air stream and entrained dust particles are drawn inwardly to the filter elements 72 which remove the particulate from the air stream and pass a clean, filtered air stream via the manifolds 76, and ducts 76' through the fan units 74 and to exhaust through the ducts 78 to the atmosphere.

As in the previous embodiment, the capacity of the fans 74 are sized to handle, as a minimum, the displaced air volume in hopper 50 which results from the unloading of a railway car 48. In addition, the fans 74 are preferably oversized to draw a greater volume of air per unit time than is necessary to evacuate the displaced air within the hopper 50 so as to create a negative draft of clean air at the restricted openings 64 and 66, adjacent the shield plates 58 and 60. In this manner, the fugitive dust and displaced air trapped within the isolated region 54, beneath the shield plates 58 and 60, is withdrawn by the dust collection system 70 while any secondary dust formations which occur on the exterior of the shield plates 58 and 66 are drawn inwardly by the negative draft created through the restricted openings 64 and 66. This feature is also particularly useful in drawing off any secondary dust which is generated by the rotating lump breaker 68, which is then withdrawn through the restricted opening 66 by the downwardly flowing draft of clean air.

A still further embodiment of the dust control system of the present invention is depicted in FIGS. 7–9 which is combined with a hopper adapted to receive bulk material dumped from a front end loader and also from a conveyor system. In this embodiment, the hopper, generally designated 80, comprises downwardly sloping sidewalls 82, 82', an inwardly sloped front wall 84, having a vertically extending upper portion 84', joined together by a vertically extending rear sidewall 86. Hopper 80 includes a discharge outlet 88 at the bottom thereof for discharging the bulk material onto a conventional take-away system, in the form of a conveyor belt 90. The hopper 80 also includes a front shield plate 92 which slopes downwardly and toward the front wall 84' of the hopper to define a restricted opening 94 therebetween. The hopper 80 also includes a pair of side shield plates 96 and 96' which extend downwardly in a sloping manner toward the side plates 82 and 82' of the hopper to define, respectively, restrictive openings 98 and 98' therebetween. The side shield plates also include transverse wing sections, comprising shield plates 97 and 97', FIG. 7. The sloped shield plates within the hopper 80 form convenient loading sites for a front end loader which dumps a load of bulk material in any one of the three loading sites provided by restrictive openings 94, 98 or 98'. The sloped, shield plates 94, 96, and 96', are respectively joined to vertical walls 115 and 117 and an integral top plate member 116 to effectively close-off the open spaces of the top of the hopper 80 and create an isolated dust containment region 102 within the interior of the hopper.

A dust collector device, generally designated 100, is associated with the hopper 80 and situated in communication with the isolated dust containment region 102. The dust collector device 100 comprises a plurality of fabric filter elements 104 having hollow interiors which communicate with air ducts 106, 108 and with fans 110 having exhaust outlets 112. As in the previously described embodiments, the fans 110 create a negative draft within each of the filter elements 104 to draw in the displaced air and entrained fugitive dust created when a load of bulk material is dumped into the hopper 80. The particulate dust material is accumulated as a filter cake on the surfaces of the fabric filter elements 104 while the air is filtered therethrough to pass through the ducts 106 and 108 and finally exhaust through the outlet 112 as clean, filtered air, posing no pollution danger to the surrounding environment. As in the previous embodiments, the filters 104 may be fitted with a compressed air, back flushing system to periodically remove the dust cake therefrom and deposit the material back into the interior of the hopper 80 for recovery by conveyor 90.

The hopper 80 depicted in FIGS. 7–9 also contains a pair of loading ports 114 formed through the top plate 116 which communicate with the interior of the hopper 80. The loading ports 114 are adapted to receive bulk material from a loading conveyor belt (not shown) which deposits the material directly from the ports and into the hopper 80 as shown in FIG. 9. In both of the embodiments, namely, the front end loader or the conveyor loader, the total fan capacity is of sufficient horsepower so that it is capable of handling the volume of air displaced when either the front end loader and/or the conveyor system is depositing material into the hopper 80. The fans also, preferably, are of sufficient capacity to not only draw in the displaced air but also to create a negative draft of fresh air through the restricted openings, 96, 96', 98 and 98'. When the conveyor ports 114 are not in use, they would, of course, be closed with appropriate cover plates to minimize the open areas in the hopper 80.

While specific embodiments of the invention have been described in detail, it will be appreciated by those skilled in the art that various modifications and alternatives to those details could be developed in light of the overall teachings of the disclosure. For example, rather than using a pair of dust collector devices 20, 20' as in the embodiment of FIGS. 1–4, only one collector device may be found sufficient or, alternatively, three, four or more collectors might be required, depending upon the size of the hopper and the capacity of the fans employed. Accordingly, the particular arrangements disclosed are meant to be illustrative only and not limiting as to the scope of the invention which is to be given the full breadth of the appended claims and any and all equivalents thereof.

What is claimed is:

1. Apparatus for controlling dust emissions in a hopper during bulk material dumping operations, comprising shield plate means adapted to be positioned adjacent a top portion of the hopper and adapted to extend across said hopper to close-off substantially a majority of the open space at said top portion of the hopper, said shield plate means defining at least one restricted opening to permit the dumped bulk material to flow therethrough and into the interior of said hopper, said shield plate means also adapted to define an isolated dust containment region within the interior of the hopper; and dust collector means having filter elements positioned within the isolated dust containment region adapted to draw in displaced air and entrained dust generated within the hopper when bulk material is dumped therein.

2. The dust control apparatus of claim 1 wherein the shield plate means comprises a pair of main shield plate members joined at a common edge thereof and adapted to extend across a mid-region of the hopper and sloping downwardly toward the hopper interior, and further including opposed pairs of side shield plates and end shield plates, adapted to downwardly slope toward the hopper interior and terminate adjacent terminal edge portions of said respective main shield plates, to form a restrictive opening on respective sides of the common edge of the main shield plates.

3. The dust control apparatus of claim 2 wherein the dust collector means comprises two dust collector devices, each positioned on an opposite side adjacent the top portion of said hopper, each collector device having a plurality of hollow fabric filter elements located beneath the main shield plates, said dust collector devices including compressed air cleaning means communicating with said fabric filter elements to periodically clean dust cake accumulated thereon, whereby said removed dust cake material is deposited in said hopper for subsequent recovery.

4. The dust control apparatus of claim 3 wherein the hopper is adapted to receive bulk material from a clamshell bucket.

5. The dust control apparatus of claim 1 including a plurality of spaced-apart bar elements extending on the exterior of said shield means covering said restricted opening and adapted to prevent the passage of oversized lumps of bulk material therethrough.

6. The dust control apparatus of claim 1 wherein the shield means comprises a first shield plate member adapted to extend across a top portion of said hopper and sloping downwardly therein, adapted to be in the flow path of the bulk material being dumped, a second, downwardly sloping shield plate member having a first edge spaced-apart from a lowermost edge of said first shield plate member to define a first restricted opening therebetween for the passage of bulk material, said second shield plate also having a second edge adapted to be in spaced relationship to a sidewall of said hopper to define a second restricted opening therebetween, said apparatus further including a plurality of spaced-apart bar elements extending from an upper edge portion of the first shield plate member to the first edge of said second shield member, whereby oversized lumps of bulk material are retained on said bar elements to pass over the first restricted opening and pass to the second sloped shield plate; said apparatus further including lump breaker means positioned in spaced relation to the second edge of the second shield plate adapted to engage and break-up the oversized lumps of bulk material to permit passage thereof through said second restricted opening.

7. The dust control apparatus of claim 6 wherein the dust collector means includes a plurality of hollow fabric filter elements positioned adjacent to and beneath said first sheid plate member and further including compressed air back flushing means for periodically cleaning accumulated dust cake from the filter elements.

8. The dust control apparatus of claim 7 wherein the hopper is adapted to receive bulk material from a rotary railroad car dumper.

9. The dust control apparatus of claim 1 wherein the dust collector means includes fan means having an air handling capacity at least as great as the volume of air displaced within said hopper interior when a load of bulk material is dumped therein.

10. The dust control apparatus of claim 9 wherein the air handling capacity of said fan means is in excess of that required to draw in said volume of displaced air, whereby, a negative draft of clean air is established at the restricted opening, adapted to draw in secondary dust which may be generated on the exterior of said shield means.

11. In combination, a hopper having an open top perimeter portion and a dust control apparatus positioned adjacent the top portion of said hopper, said apparatus comprising a vertical walled enclosure secured around the top perimeter portion of said hopper; shield plate means positioned within said vertical walled enclosure and extending thereacross to close-off substantially a majority of the open space at the top portion of the hopper, said shield plate means defining at least one restricted opening which is adapted to permit dumped bulk material to flow therethrough and into the interior of said hopper, said shield plate means also defining an isolated dust containment region therebeneath; and dust collector means having filter elements positioned within the isolated dust containment region adapted to draw in displaced air and entrained dust generated within the hopper when bulk material is dumped therein.

12. The combination of claim 11 wherein the shield plate means comprises a pair of main shield plate members joined at a common edge thereof, extending across the center of the hopper and attached to opposed vertical walls of the enclosure and sloping downwardly toward the hopper interior, and further including opposed pairs of side shield plates and end shield plates, attached to said walled enclosure and downwardly sloping and terminating adjacent terminal edge portions of said respective main shield plates to form a restrictive opening on respective sides of the common edge of the main shield plates.

13. The combination of claim 12 wherein the dust collector means comprises two dust collector devices, each positioned on an opposite side of said vertical walled enclosure, each collector device having a plurality of hollow fabric filter elements located beneath the pair of main shield plates, said dust collector devices including compressed air cleaning means communicating with said fabric filter elements to periodically clean dust cake accumulated thereon, whereby said removed dust cake material is deposited in said hopper for subsequent recovery therefrom.

14. The combination of claim 13 wherein the hopper is of the type adapted to receive bulk material from a clamshell bucket.

15. The combination of claim 14 wherein the hopper includes a supporting structural frame having a plurality of wheels fitted thereto, whereby, the hopper and attached dust control apparatus is movable between a plurality of unloading sites.

16. In combination, a bulk material receiving hopper situated beneath a rotary railroad car dumper, said hopper having an open top portion and downwardly sloping sidewalls and opposed end walls defining a hopper interior and a dust control apparatus comprising a first shield plate member extending across the top portion of said hopper between the end walls thereof and sloping downwardly therein, adapted to be in the flow path of the bulk material being dumped, a second, downwardly sloping shield plate member also extending between the hopper endwalls and having a first edge spaced-apart from a lowermost edge of said first shield plate member to define a first restricted opening therebetween for the passage of bulk material, said shield plates defining an isolated dust containment region within the hopper interior, said second shield plate also having a second edge in spaced relation to a sidewall of said hopper to define a second restricted opening therebetween, said apparatus further including a plurality of spaced-apart bar elements extending from an upper edge portion of the first shield plate member to the first edge of said second shield member, whereby oversized lumps of bulk material are retained on said bar elements to pass over the first restricted opening, and pass to the second sloped shield plate, said apparatus further including lump breaker means positioned in spaced relation to the second edge of the second shield plate adapted to engage and break-up the oversized lumps of bulk material to permit passage thereof through said second restricted opening; and said apparatus further including dust collector means having filter elements positioned within the isolated dust containment region adapted to draw in displaced air and entrained dust generated within the hopper when bulk material is dumped therein.

17. The combination of claim 16 wherein the dust collector means includes a plurality of hollow fabric filter elements positioned adjacent to and beneath said first shield plate member and further including compressed air back flushing means for periodically cleaning accumulated dust cake from the filter elements.

18. In combination, a hopper adapted to receive bulk material from a front end loader and the like having an open top portion, opposed front and rear walls joined by opposed sidewalls defining a hopper interior therein, and a dust control apparatus positioned adjacent the top portion of said hopper, comprising shield means extending across the open top portion of the hopper to substantially close-off all of the open space at said top portion, said shield means including top plate means positioned in a central region of the top portion of the hopper, at least one shield plate connected to said top plate means, sloping downwardly and toward one of the hopper walls in spaced relation thereto to define a restricted opening therebetween for the passage of dumped bulk material into the interior of the hopper, said shield means defining an isolated dust containment region therebeneath, and dust collector means having filter elements positioned within the isolated dust containment region adapted to draw in displaced air and entrained dust generated within the hopper when bulk material is dumped therein.

19. The combination of claim 18 wherein the shield means includes a front shield plate, and a pair of opposed side shield plates connected to the top plate means wherein each shield plate slopes downwardly to a respective hopper sidewall to define a front and a pair of side restrictive openings for the passage of bulk material dumped by a front end loader and the like.

20. The combination of claim 19 wherein the top plate means also has at least one loading port formed therein and in communication with the hopper interior adapted to receive bulk material from a conveyor belt.

21. A method of controlling dust emissions in a bulk material receiving hopper of the type having an open top portion comprising the steps of:
  placing shield plate means within the receiving hopper to decrease the open space at the top portion of the hopper and to provide at least one restricted flow passage for the bulk material being dumped;
  creating an isolated dust containment region beneath the shield plate means to trap displaced air and fugitive dust therein;
  providing a negative draft of air within the isolated dust containment region to draw in the displaced air and fugitive dust; and
  transmitting the displaced air and fugitive dust to dust collector means to capture the dust and exhaust clean air therefrom.

22. The method of claim 21 including the step of providing an excess negative draft to also draw in air through the restricted opening of the shield plate means.

* * * * *